(12) United States Patent
Lucas

(10) Patent No.: US 6,804,126 B2
(45) Date of Patent: Oct. 12, 2004

(54) POWER SUPPLY START UP CIRCUIT

(75) Inventor: Christopher Graham Lucas, Arnprior (CA)

(73) Assignee: Mitel Knowledge Corporation, Kanata (CA)

(*) Notice: Subject to any disclaimer, the term of this patent is extended or adjusted under 35 U.S.C. 154(b) by 0 days.

(21) Appl. No.: 10/342,263

(22) Filed: Jan. 15, 2003

(65) Prior Publication Data

US 2003/0133315 A1 Jul. 17, 2003

(30) Foreign Application Priority Data

Jan. 16, 2002 (GB) .............................. 0200934

(51) Int. Cl.[7] .......................................... H02M 3/335
(52) U.S. Cl. ...................... 363/21.01; 363/49; 363/20
(58) Field of Search .............................. 363/49, 21.01, 363/20, 131

(56) References Cited

U.S. PATENT DOCUMENTS 4,246,634 A * 1/1981 Purol ........................... 363/49
4,370,701 A * 1/1983 Western ....................... 363/20
4,866,590 A * 9/1989 Odaka et al. ................ 363/49
5,459,652 A * 10/1995 Faulk ........................... 363/49
5,953,219 A * 9/1999 Matsumoto ............... 363/21.16

FOREIGN PATENT DOCUMENTS

| EP | 0 262 581 | 4/1988 |
|---|---|---|
| GB | 1 566 940 | 6/1977 |
| GB | 1 602 920 | 5/1978 |
| WO | WO 89/03136 | 4/1989 |

* cited by examiner

Primary Examiner—Shawn Riley
(74) Attorney, Agent, or Firm—Keating & Bennett LLP

(57) ABSTRACT

A circuit provides a secondary output voltage from an input voltage. The circuit includes power supply circuitry for creating an unregulated DC bus voltage line and a regulator circuit connected to the DC bus voltage line for controlling a first switch in series with a transformer winding. The control circuit samples an output voltage to control the output voltage by cycling the first switch. The circuit further includes a pulse generator circuit connected to the regulator circuit for controlling start and stop cycles of the regulator circuit and a comparator circuit connected to the pulse generator circuit for monitoring the secondary output voltage and for disabling the pulse generator circuit during normal operation of the power supply circuit.

8 Claims, 4 Drawing Sheets

POWER SUPPLY START UP CIRCUIT

FIELD OF THE INVENTION

The present invention relates to a power supply start up circuit and more particularly to a power supply start up circuit designed to inhibit power losses by dissipation therefrom.

BACKGROUND OF THE INVENTION

Switching power supplies of various topologies are used to provide a regulated output voltage (Vreg) from an unregulated or regulated input voltage (Vin).

As discussed in greater detail below, prior art switching power supplies suffer from prolonged or erratic start-up times as a result of the time constraints in standard prior art resistor capacitor startup circuits.

Also, prior art switching power supplies are prone to continuous power dissipation in the bleeder resistor of the standard resistor capacitor startup circuit during normal operation.

Furthermore, prior art switching power supplies suffer from excessive heating of circuit components during overload or short circuit conditions where such heating is as a result of the output being cycled on and off at a rate determined principally by the time constraints in the standard resistor capacitor startup circuit.

BRIEF DESCRIPTION OF THE DRAWINGS

The invention and the prior art will be better understood with reference to the drawings and the following description in which.

DETAILED DESCRIPTION OF THE PRIOR ART

Figure 1:
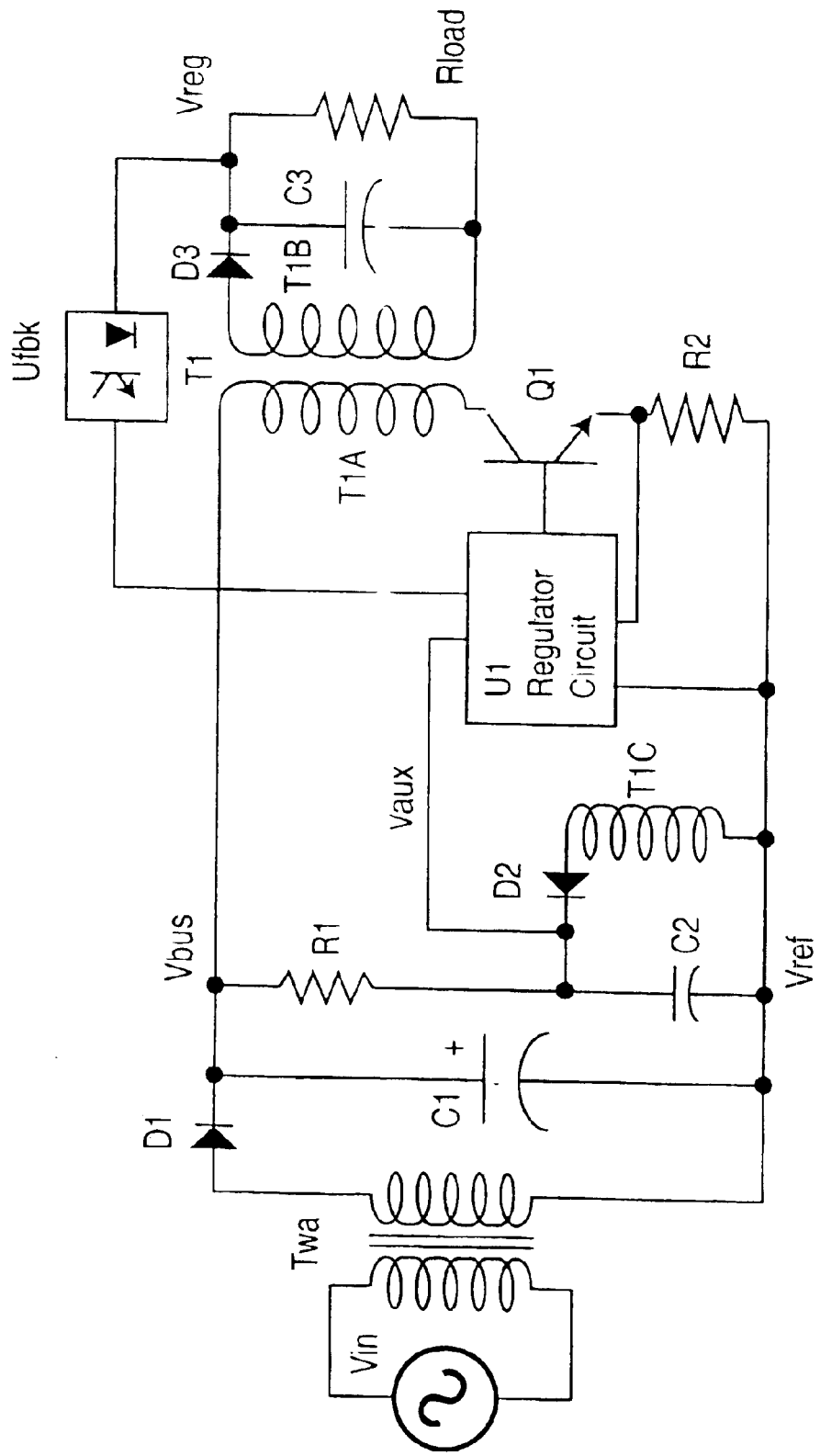
FIG. 1 is a schematic diagram of a typical industry standard switching power supply circuit of the prior art.

FIG. 1 is a schematic diagram of a typical industry standard switching power supply circuit of the prior art, commonly referred to as a "flyback" topology. Referring to FIG. 1, a commercial AC input voltage (Vin) is stepped down by a transformer (wall adapter power supply) Twa. The wall adapter power supply is connected to an AC/DC rectifier diode D1 that is in turn connected to a capacitor C1 to create an unregulated DC bus voltage (Vbus).

A control circuit U1 controls the operation of a transistor switch Q1 that is connected in series to a primary transformer winding T1A. The control circuit U1 controls secondary output voltages Vaux and Vreg by varying on and off times of the transistor switch Q1. In the present example of the prior art, the output voltage Vreg is isolated by a standard optocoupler Ufbk such that a regulated voltage is maintained at various values of external load resistance Rload and input power Vin.

During the initial application of input power Vin, the capacitor C1 charges up to the peak value of the rectified AC input voltage, (or DC input voltage value if the power supply is powered by a DC input). A small charging current flows from the bus voltage Vbus through the resistor R1 and into the capacitor C2 causing its voltage to rise. When the voltage across the capacitor C2 exceeds the start threshold value for the control circuit U1 (typically 16 VDC), transistor switch Q1 is switched on causing AC current to flow in the primary transformer winding T1A. The secondary output voltages Vaux, Vreg are then induced by transformer action in output windings T1B and T1C causing the secondary output voltages Vreg, Vaux to rise to steady state values. While the secondary output voltages Vreg,Vaux are rising, the voltage across the capacitor C2 is steadily decreasing due to the fact that the operating current of the circuit U1 is typically more than can be supplied through the resistor R1 alone. For sustained operation, the output voltage Vaux must rise quickly enough to prevent the capacitor C2 from dropping below the control circuit U1 stop threshold voltage. If this does not occur, the output voltage Vaux will drop below the stop threshold of the control circuit U1 (typically 10 VDC) and the power supply secondary output voltages will drop to zero. A new start cycle must then be initiated and the process is repeated until the power supply starts.

The prior art switching power supply of FIG. 1 suffers from a number of disadvantages. Firstly, the value of the resistor R1 is typically chosen as a compromise between low power dissipation and reliable startup characteristics under low input power conditions (Vin) and high current external load (Rload) conditions. Since the input voltage Vin can typically vary between 20 VDC and 33 VDC while the output voltage Vaux is typically approximately 12 VDC, the resistor R1 is usually chosen to have a high resistance value in order to minimise the current flowing through it and subsequent power dissipation within it. This is desirable, as power loss in the resistor R1 reduces the efficiency of the power supply and increases internal heating, thereby reducing the reliability of the power supply. At high DC bus voltages (Vbus) this problem becomes more severe as the power dissipated in the resistor R1 increases as the square of voltage (Power=Vbus×Vbus/R1). If, however, the resistance of the resistor R1 is too high, the charging current available through it may be insufficient to overcome the combined leakage current of the capacitor C2 and the control circuit U1. Especially at low values of DC bus voltage (Vbus)this can result in the voltage across the capacitor C2 failing to reach a value equivalent to the start threshold voltage of the control circuit U1 and consequent failure of the power supply to start.

An additional problem with this prior art circuit is that, after the supply is operating normally and the control circuit U1 is being powered principally from the secondary output voltage Vaux, charging current still flows through the resistor R1 from the bus voltage (Vbus) to the output voltage (Vaux). Power is therefore dissipated within the resistor R1 continuously. At high bus voltage (Vbus) values the dissipation increases as the square of the bus voltage, (Vbus) as described above. This means that the resistor R1 must be sized for continuous dissipation at these worst case conditions, thereby increasing the size and cost of the resistor R1. This results in internal heating that reduces the lifetime of other components in the vicinity of R1 as well as lowering the efficiency and increasing the operating cost of the power supply.

Another problem with the prior art circuit of FIG. 1 is that the value of the capacitor C2 is typically chosen to provide sufficient energy storage to allow the control circuit U1 to continue operating long enough for the output voltages Vreg, Vaux to reach their steady state values as explained above.

If the value of the capacitor C2 is too small it may not retain sufficient energy to enable the power supply to start before the voltage across it drops below the control circuit U1 shutdown threshold voltage. This is a problem with high current external load (Rload) values which may require several switching cycles to build up the output voltage Vreg and subsequently the output voltage Vaux to their steady state values. One solution is to make the value of the capacitor C2 larger in order to have more energy storage available for a longer control circuit U1 operating time. However, if the capacitor C2 is made too large without changing the resistor R1, more time is required to charge C2 up to the control circuit U1 start threshold voltage value. This is especially true under conditions of low bus voltage (Vbus) when the resistor R1 charging current is lowest. This can result in excessively long power supply start up times which are inconvenient and generally cause confusion in the mind of the user as to whether the unit is defective or not. Attempts to remedy this situation by changing the value of the resistor R1 result in all of the problems related to the selection of this component described above.

Yet another disadvantage of this prior art circuit is that the resistor R1 and the capacitor C2 in combination determine the time interval between successive start and restart cycles such as occur when the power supply is in what is called, "current limit" mode. Current limit occurs when the resistance of the external load Rload drops to a very low value such that the current flowing through it increases beyond the design limit of the power supply. In typical switching power supply circuits the control circuit U1 senses this condition by monitoring the voltage drop across resistor R2, although other types of current sensing may also be used. When the voltage across the resistor R2 exceeds a minimum threshold, the control circuit U1 acts upon the ON time of the transistor switch Q1 to reduce the output voltage Vreg. As the load current increases, the output voltage Vreg is further reduced. As the output voltage Vreg drops, the output voltage Vaux is also reduced by the transformer action of the windings T1B, T1C. When the output voltage Vaux drops to less than the control circuit U1 stop threshold, the transistor switch Q1 stops switching, causing the output voltages Vreg, Vaux to drop to zero. The capacitor C2 then begins to recharge through the resistor R1 until its voltage reaches the control circuit U1 start threshold, whereupon the power supply attempts to restart. These current limit shutdown and restart cycles repeat until the overload is removed. The problem here is that the interval between restarts is determined by how quickly the capacitor C2 can charge from the stop to start thresholds of the control circuit U1. This "cycle" time is therefore much less than the start time since the capacitor C2, in the example of FIG. 1, only has to charge up from 10 VDC to 16 VDC compared to charging from 0 to 16 VDC as under normal start conditions. This "cycle" time is further reduced as the input voltage Vin increases due to greater charging current through the resistor R1. The net effect of decreasing the time interval between the stop and start cycles during conditions of current limit overload is to increase the heating and electrical stress of the transistor switch Q1, the transformer coils T1A, T1B, T1C, the diodes D1 and D3 as well as other current carrying printed wiring board or wiring paths and power connectors within the power supply. These stresses reduce the reliability and operating life of the power supply.

To size these components to operate at reduced temperatures under overload conditions would increase the cost and physical space required by them. Depending on the requirements of products in which the power supply is intended to be incorporated this may not be an option. Another solution is to extend this time interval between the stop and start cycles during current limit overload conditions. One method of doing this is to increase the voltage range between the capacitor U1 stop and start thresholds. Unfortunately most commercially available controller IC's have fixed stop and start threshold voltages that cannot be adjusted. Both these and discrete circuits are also typically limited by the minimum and maximum drive voltages required for the transistor switch Q1 especially if this device is a MOSFET power transistor (i.e. industry standard in this application). Yet another solution is to increase the values of the resistor R1 and the capacitor C2 to create a longer delay between stop and start cycles. Unfortunately, this has the unwanted effect of delaying the power supply startup time as described above. Also, increasing the value of the capacitor C2 will increase the time during which the power supply operates in the overload condition thereby increasing electrical stress and thermal dissipation in the unit.

SUMMARY OF THE INVENTION

As stated above, the typical startup circuit shown in FIG. 1 suffers from many disadvantages.

The value of the resistor R1 must be a compromise value. This value must be low enough to provide sufficient charging current to the capacitor C2 to ensure reliable startup in a reasonable period of time at low Vin conditions but high enough to minimise power dissipation of the resistor R1 at high Vin conditions.

The value of the capacitor C2 must also be a compromise. It must be high enough to provide sufficient energy storage for startup under full load conditions at low Vin but low enough to avoid excessively long startup times under the same conditions.

Furthermore, the resistor R1 and capacitor C2 in combination must satisfy the above two conditions as well as provide a stop/start cycling time interval during current limit overload conditions which limits the heating and electrical stress in the current carrying components within the power supply.

Since there are conflicting requirements for the optimisation of the resistor R1 and capacitor C2, practical circuits using the startup configuration of FIG. 1 typically compromise between power supply performance and reliability. For example, the power supply may start up under maximum load in a reasonable time period but may require several tries to start under these conditions at low Vin. Also, the power supply may start in a reasonable period of time but may suffer from excessive dissipation in RI during operation at high Vin, thereby reducing the power supply service life. Further, the power supply may start quickly under low Vin conditions but may fail during sustained operation during overload conditions due to rapid start/stop cycling and resultant overheating.

It is an object of the present invention to obviate or mitigate at least some of the disadvantages of the prior art.

In one aspect of the present invention, there is provided a circuit for providing a secondary output voltage from an input voltage. The circuit comprises power supply circuitry for creating an unregulated DC bus voltage line, a regulator circuit connected to the DC bus voltage line for controlling a first switch in series with a transformer winding, the control circuit sampling an output voltage to control the output voltage by cycling the switch, a pulse generator circuit connected to the regulator circuit for controlling start and stop cycles of the regulator circuit, and a comparator circuit connected to the pulse generator circuit, for monitoring the secondary output voltage and disabling the pulse generator circuit during normal operation of the power supply circuit.

DETAILED DESCRIPTION OF THE PREFERRED EMBODIMENT

Figure 2:
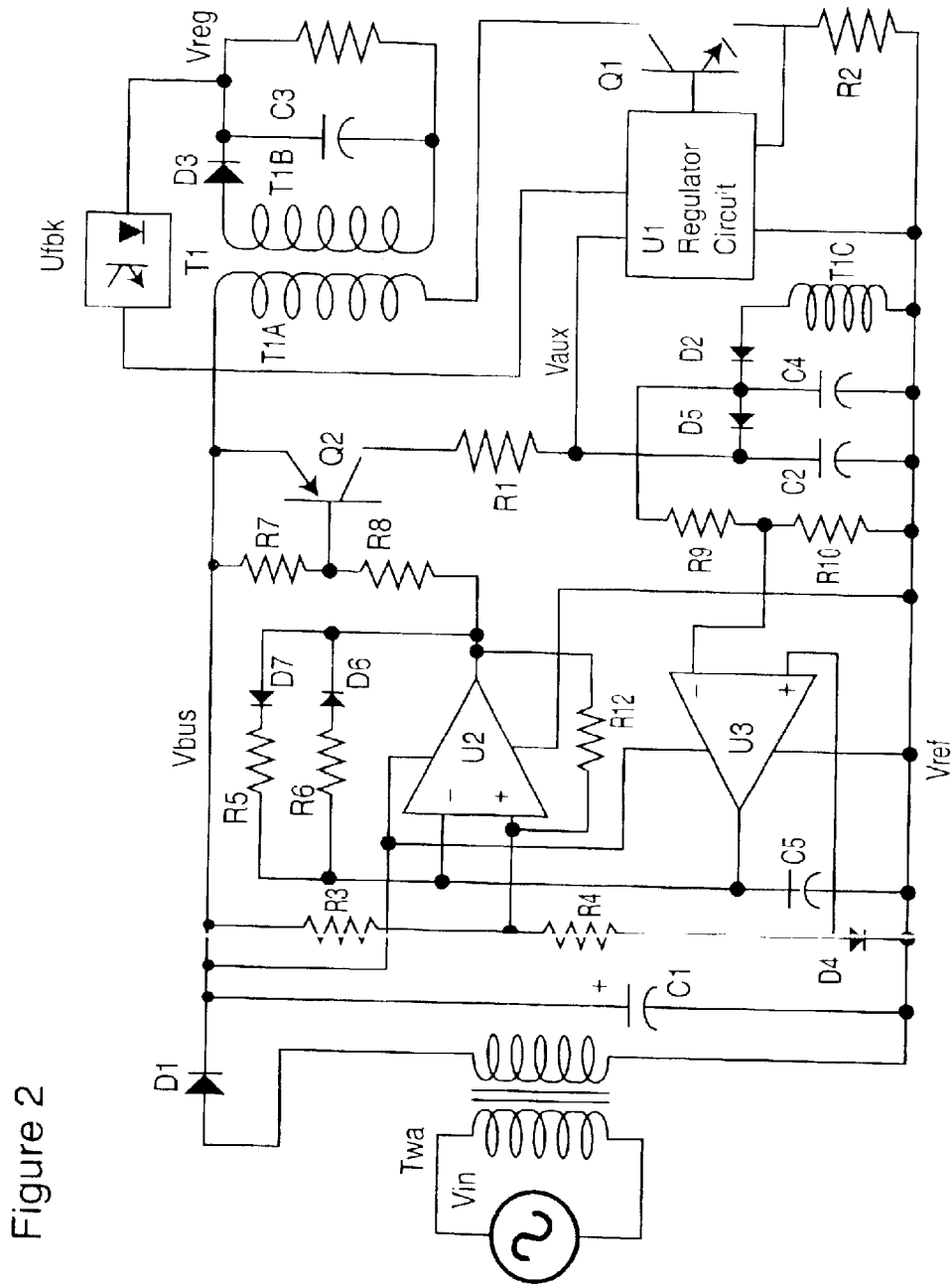
FIG. 2 is a schematic diagram of a power supply start up circuit according to an embodiment of the present invention.

Reference is made to FIG. 2 to describe a first embodiment of a power supply start up circuit according to the present invention. AC input power (Vin) is connected to a transformer (wall adapter power supply) Twa. The transformer is connected to an AC/DC rectifier diode D1 which, in turn, is connected to a capacitor C1 to create an unregulated DC bus voltage Vbus.

A pulse generator circuit is used to control the operation of a transistor switch Q2. The pulse generator circuit includes an open collector comparator U2, input resistors R3, R4 and a feedback resistor R12. A second comparator U3 is used to control the first comparator U2 to prevent repeated cycling, as will be explained further below.

When Vin is first applied, capacitor C1 is charged through AC/DC rectifier diode D1. The DC bus voltage Vbus is divided across resistors R3, R4 and connected to the comparator U2 (+).

The voltage at this point is altered by the state of the output of the comparator U2 through the feedback resistor R12. When the output of the comparator U2 is high, the transistor switch Q2 is off and the U2(+) is shifted high as resistor R12 is effectively in parallel with resistor R3. When the output of the comparator U2 is low, Q2 is on and U2(+) is, in turn, shifted low as now R12 is effectively in parallel with R4. This provides alternating high and low offset threshold voltages at U2(+). From the high state of comparator U2 with switch Q2 off, capacitor C5 charges through resistor R5, diode D7, resistor R7, and resistor R8 causing the U2(−) voltage to rise. When the U2(−) voltage exceeds the U2(+) voltage, the output of the comparator U2 switches to the low state, turning on the switch Q2 and offsetting the U2(+) threshold to a low value. The capacitor C5 then discharges through resistor R6 and diode D6 until the voltage at U2(−)drops below the U2(+) low threshold at which point the output of comparator U2 switches to its former high state, thereby turning off the switch Q2. The circuit continues to cycle the switch Q2 on and off as the capacitor C5 is charged and discharged. The value of C5 and the resistors R5, R7 and R8 determine the time constants for on and off time intervals of switch Q2, (also referred to as start and stop cycle time). In choosing the value of the capacitor C5 charge time constant (Q2 off time), the total resistance value is made high to reduce the current drawn through resistor R7 from Vbus and thereby prevent inadvertently turning on switch Q2.

When switch Q2 turns on, resistor R1 is effectively connected to the DC bus voltage Vbus and starts charging capacitor C2. When the voltage across the capacitor C2 exceeds the start threshold voltage of control circuit U1, switch Q1 is enabled and the output voltages Vreg, Vaux increase to their design values. When this occurs, sufficient voltage is available across transformer coil T1C to keep capacitor C2 charged through diodes D2, D5 for continuous operation.

The start cycle time for the pulse generator circuit is set by the discharge time constant of capacitor C5 and resistor R6. This is made longer than the power supply start time set by the R1 C2 time constant at low input voltage Vin, when the available capacitor C2 charging current is low. The start cycle time can also be further increased should additional start time be required due to high starting loads such as occur with capacitive or reactive output loads.

When the voltage across capacitor C5 or U2(−) drops below that of U2(+), the output of the comparator U2 switches to a high output level. Thus, switch Q2 turns off and resistor R1 is disconnected from Vbus. In this manner the dissipation of resistor R1 is reduced to zero. Because resistor R1 only dissipates power for a short time period, (i.e. the start cycle time), the resistor R1 can be optimised to quickly charge capacitor C2 with sufficient energy to provide reliable startup under heavy Rload conditions at low input voltage Vin. Also, the continuous power rating and hence physical size and cost of resistor R1 is minimised.

In order to prevent comparator U2 from cycling switch Q2 on and off repeatedly the comparator U3 is used to disable comparator U2 and keep switch Q2 off during normal operation. Comparator U3 does this by monitoring the voltage across capacitor C4 and comparing it to a reference voltage derived from the forward voltage of diode D4. Diode D5 isolates the monitored voltage from the voltage across capacitor C2 to inhibit erratic operation during startup. Capacitor C4 provides local filtering of the rectified voltage from transformer coil T1C. When this voltage reaches its normal operating level the voltage across the R9/R10 divider seen at U3(−) exceeds that of U3(+) causing the output of comparator U3 to switch to a low voltage level, thereby discharging capacitor C5. Comparator U2 is thus disabled with its output in the high or non-conducting state. Switch Q2 is, by extension, turned off and no current flows through resistor R1.

While the transformer T1C (Vaux) voltage is monitored in FIG. 2, Vreg or any other secondary output could be monitored to disable the pulse generator circuit, as would occur to those of skill in the art. If Vreg is an isolated output, as shown in FIG. 1, an isolating device similar to the optocoupler shown in the Ufbk block could be used to provide the required isolation. If a current limit overload should occur on output voltage Vreg, the resulting switch Q1 current is sensed across resistor R2 by control circuit U1 whereupon the switching action of switch Q1 is reduced such that output voltage Vreg is decreased with increasing load. As this load increases, the voltage across transformer coil T1C drops and at some point will fall below the stop threshold of control circuit U1 causing switch Q1 to cease switching and output voltage Vreg to drop to zero. When this occurs, the output of comparator U3 goes high allowing capacitor C5 to resume its charge/discharge cycle turning switch Q2 off and on as described above. If the output voltages Vreg, Vaux do not reach their nominal values as a result of the overload by the time the start cycle terminates and the stop cycle begins (i.e. a time interval determined by the R6/C5 discharge time constant), the start and stop cycles are repeated until the overload is removed.

Diodes D6 and D7 provide separate discharge and charge paths for C5 thereby allowing the start and stop cycles to have different time intervals. It is desirable to make the stop time longer than the start time to reduce the dissipation during sustained overload operation.

The current required by this circuit and subsequent power loss within it should be considered in component selection, as would occur to those of skill in the art. Because the circuit requires very low current to operate, and the required current is further reduced when the circuit is disabled during normal operation of the power supply, the net power loss is reduced compared to that required by the circuit shown in FIG. 1.

Figure 3:
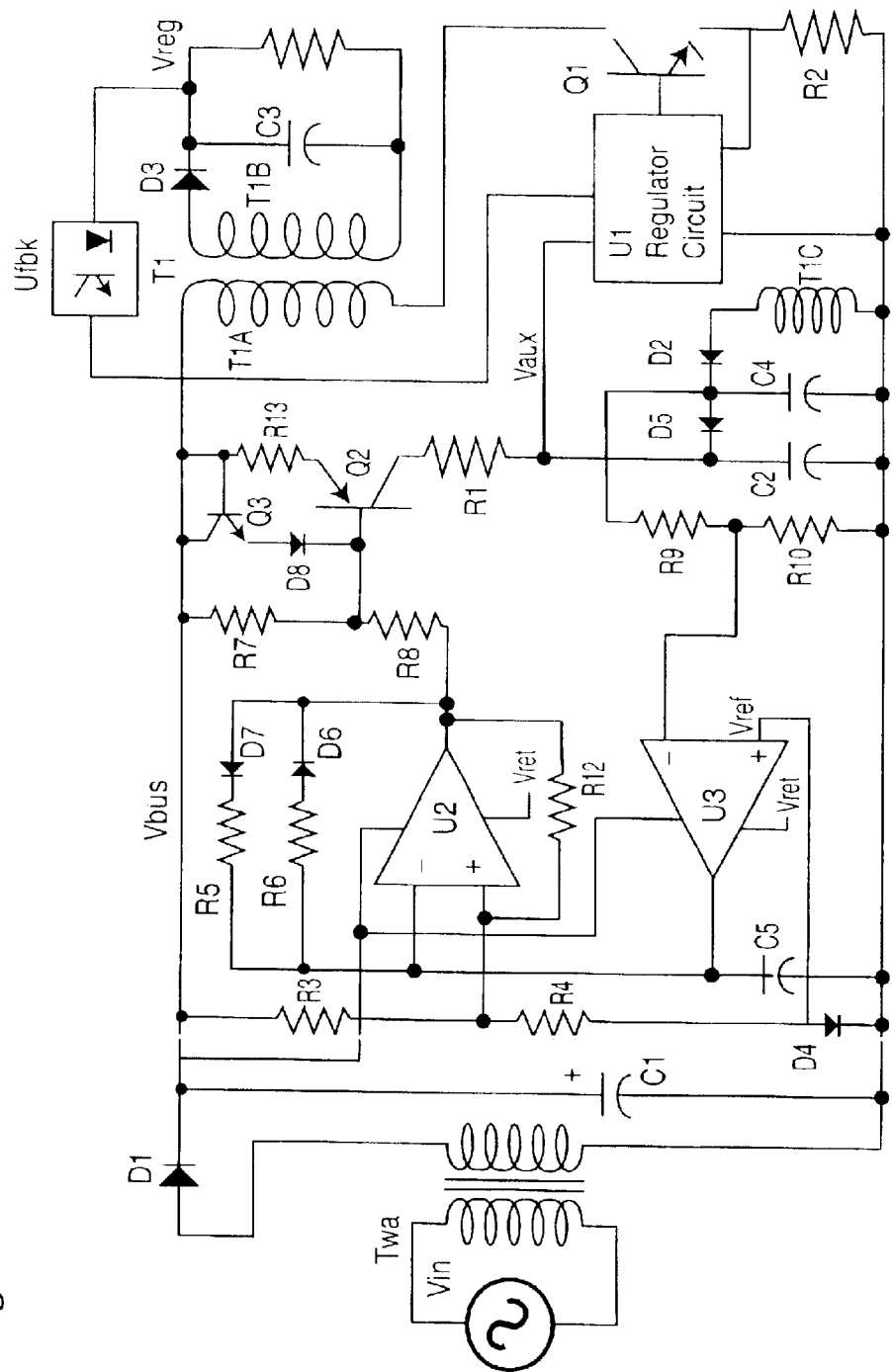
FIG. 3 is a schematic diagram of a power supply start up circuit according to a second embodiment of the present invention.

Reference is now made to FIG. 3 to describe a second embodiment of a power supply start up circuit according to the present invention. The present embodiment is similar to the first embodiment of FIG. 2, however, an additional transistor switch (Q3), diode (D8) and resistor (R13) combination is added to the Q2 pulse generator circuit to provide a substantially constant capacitor C2 charging current. This results in a substantially constant startup time for the power supply over a range of DC bus voltages Vbus.

In operation, when the Q2 collector current reaches a threshold, set by the point at which the voltage drop across resistor R13 exceeds the base-emitter voltage of Q3 plus the forward drop across diode D8, switch Q3 turns on. The effect of this is to divert base drive current away from switch Q2 causing it to turn off. This results in an increased voltage drop across the Q2 collector-emitter junction with less current flowing through R1. As this current falls, switch Q3 turns off as the base-emitter voltage of Q3 plus forward drop across diode D8 exceeds the voltage drop across R13. Thus, the current through R1 remains substantially constant. Diode D8 is required to cancel out the voltage drop across the Q2 base-emitter junction.

Figure 4:
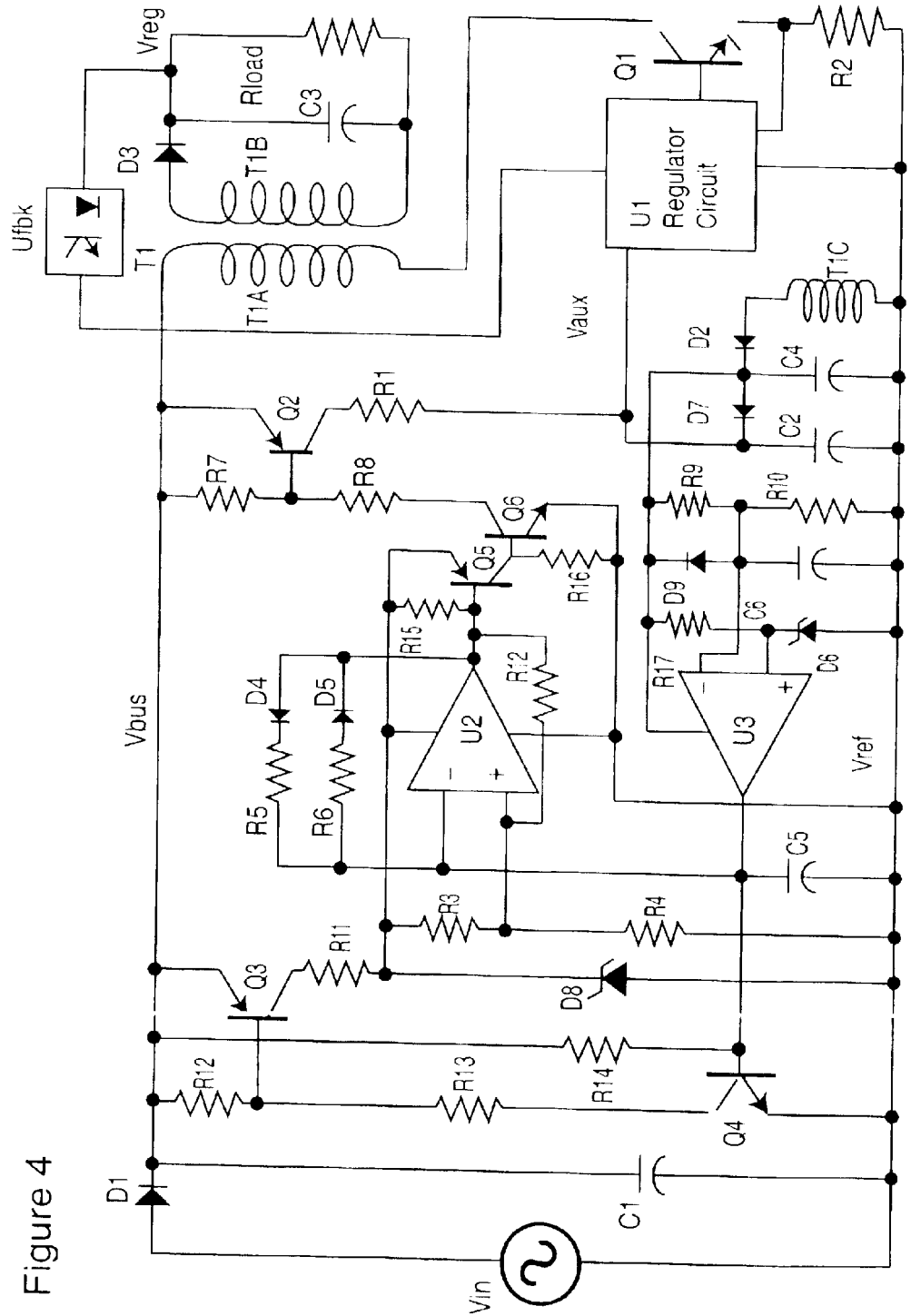
FIG. 4 is a schematic diagram of a power supply start up circuit according to a third embodiment of the present invention.

Referring now to FIG. 4, a third embodiment of the present invention is shown in which the circuit can be used. The circuits of FIGS. 2 and 3 are powered from a low voltage wall adapter power supply Twa. In the third embodiment, the wall adapter power supply Twa is replaced by a direct connection to the input voltage Vin. As in the previous embodiments, a diode D1 is used to provide an unregulated DC bus voltage Vbus.

The typical Vbus voltage range corresponds roughly to the peak AC value of Vin. For a universal input switching power supply, known to those of skill in the art, Vbus can typically vary from about 125 VDC to 370 VDC over the 90 VAC to 264 VAC range. Since the industry standard comparators U2 and U3 typically have a voltage rating of less than 40 VDC, the present embodiment includes voltage level shifting transistors and other modifications to the first embodiment, to enable operation with a high DC bus voltage Vbus.

In operation, when the input voltage Vin is first applied the DC bus voltage Vbus rises to its steady state value. Current flows through resistor R14 and turns on switch Q4 which, in turn, turns on switch Q3, thereby connecting the DC bus voltage Vbus to resistor R11. The resistor R11 and regulating diode D8 maintain a substantially uniform voltage across comparator U2 (typically 12 VDC) over the DC bus voltage range described above. Comparator U2 operates in the same manner as in the above-described embodiments with the exception that level shifting transistors Q5, Q6 and associated resistors R15, R16 are added to keep the U2 output transistor isolated from DC bus (Vbus) voltage levels. When the power supply begins its start cycle the voltages across the secondary outputs rise. When the voltage across capacitor C4 reaches its nominal voltage, the level at U3(-) set by R9/R10, exceeds the reference voltage set by the regulating diode D6 at U3(+). The comparator U3 output then switches to a lower level, causing switches Q4 and Q3 to turn off. In the present embodiment, capacitor C6 is added to increase the time delay of the switching action of comparator U3 to make the circuit insensitive to transient voltage conditions such as may arise during the start cycle or even during normal operation.

Diode D9 ensures that capacitor C6 is quickly discharged during a stop cycle to inhibit erratic operation during subsequent start cycles caused by residual voltage across capacitor C6. When switch Q3 turns off, the comparator U2 start circuit is disabled and power dissipation in resistors R11, R1 is reduced. The remaining power dissipated by the startup circuit from the DC bus voltage Vbus is confined to resistor R14 through comparator U3. Since resistor R14 provides only a fraction of a milliamp to operate switch Q4, the total power dissipation is very low.

Alternative embodiments and variations of the invention are possible, for example, a single diode D1 is shown but any standard diode and capacitor configuration can be used to provide an unregulated DC output voltage (Vbus) from the AC input. Also, although the output voltage Vreg is isolated by the optocoupler, Vreg need not necessarily be isolated. While a comparator circuit is shown, any industry standard equivalent pulse generator circuit can be substituted as would occur to those of skill in the art. Other variations and modifications would occur to those of skill in the art, all of which are believed to be within the sphere and scope of the invention as defined by the claims.

We claim:

1. A circuit for providing a secondary output voltage from an input voltage, the circuit comprising:

power supply circuitry for receiving said input voltage and in response generating an unregulated DC bus voltage;

a regulator circuit for receiving said DC bus voltage though an input resistor and in response enabling a first switch in series with a transformer winding during a predetermined power supply start cycle and disabling said first switch during a predetermined power supply stop cycle to generate said secondary output voltage for application to a load, said regulator circuit including a control circuit for sampling said secondary output voltage and in response cycling said switch in accordance with said power supply start and stop cycles thereby regulating said secondary output voltage;

a pulse generator circuit for connecting said input resistor to said DC bus voltage during a predetermined start cycle of said pulse generator circuit and disconnecting said input resistor from said DC bus voltage during a predetermined stop cycle of said pulse generator circuit, wherein said start cycle of said pulse generator circuit is longer than said power supply start cycle to ensure start up of said regulator circuit in the event said unregulated DC bus voltage is low and said load is high, and wherein said predetermined stop cycle is longer than said predetermined start cycle for reducing power dissipation within said regulator circuit during sustained overload operation thereof; and a further circuit connected to the pulse generator circuit, for monitoring the secondary output voltage and disabling the pulse generator circuit during normal operation of the power supply circuit, thereby minimizing power dissipation through said input resistor.

2. A circuit for providing a secondary output voltage from an input voltage, the circuit comprising:

power supply circuitry for receiving said input voltage and in response generating an unregulated DC bus voltage;

a regulator circuit for receiving said DC bus voltage though an input resistor and in response enabling a first switch in series with a transformer winding during a predetermined power supply start cycle and disabling said first switch during a predetermined power supply stop cycle to generate said secondary output voltage for application to a load, said regulator circuit including a control circuit for sampling said secondary output voltage and in response cycling said switch in accordance with said power supply start and stop cycles thereby regulating said secondary output voltage;

a pulse generator circuit for connecting said input resistor to said DC bus voltage during a predetermined start cycle of said pulse generator circuit and disconnecting said input resistor from said DC bus voltage during a predetermined stop cycle of said pulse generator circuit, wherein said start cycle of said pulse generator circuit is longer than said power supply start cycle to ensure start up of said regulator circuit in the event said unregulated DC bus voltage is low and said load is high; and a further circuit connected to the pulse generator circuit, for monitoring the secondary output voltage and disabling the pulse generator circuit during normal operation of the power supply circuit, thereby minimizing power dissipation through said input resistor; wherein said pulse generator further comprises a first comparator having a non-inverting input connected to a first source of reference voltage, an inverting input connected to a capacitor for receiving charge from said input voltage and to an output of said comparator via a first series connected feed back resistor and diode connected with first polarity and a second series connected feed back resistor and diode connected with opposite polarity, said output being connected to a control input of a switch for selectively connecting and disconnecting said input resistor to and from said unregulated DC bus voltage, respectively, for supplying start up current in response to said capacitor being charged through said first series connected resistor and diode to a voltage level in excess of said reference voltage and ceasing the supply of start up current in response to said capacitor being discharged through said second series connected resistor and diode to a voltage level less than said reference voltage.

3. The circuit of claim 2, wherein said capacitor and first resistor are characterized by a time constant for establishing said predetermined start cycle.

4. The circuit of claim 3, wherein said capacitor and second resistor are characterized by a further time constant for establishing said predetermined stop cycle.

5. The circuit of claim 4, wherein said time constants are selected such that said predetermined stop cycle is longer than said predetermined start cycle for reducing power dissipation within said regulator circuit during sustained overload operation thereof.

6. The circuit of claim 2, wherein said further circuit further comprises a further comparator having a non-inverting input connected to a further source of reference voltage less than said first source of reference voltage, an inverting input for receiving a voltage proportional to said secondary output voltage, and an output connected to said capacitor and said inverting input of said first comparator, such that in response to said secondary output voltage reaching a normal operating level the output of said further comparator switches to a low voltage thereby discharging said capacitor through said second series connected resistor and diode so as to disconnect said input resistor from said DC bus voltage.

7. The circuit of claim 1, further comprising an additional circuit for maintaining constant current from said pulse generator circuit though said input resistor during said predetermined start cycle, thereby maintaining said predetermined power supply start cycle constant over a range of said unregulated DC bus voltage.

8. The circuit of claim 2, further comprising a level shifting circuit for maintaining a substantially uniform voltage across said first comparator over a range of said unregulated DC bus voltage.

* * * * *